G. C. STARCHER.
FRUIT SIZING MACHINE.
APPLICATION FILED JAN. 2, 1917.
1,258,958.
Patented Mar. 12, 1918.
3 SHEETS—SHEET 1.
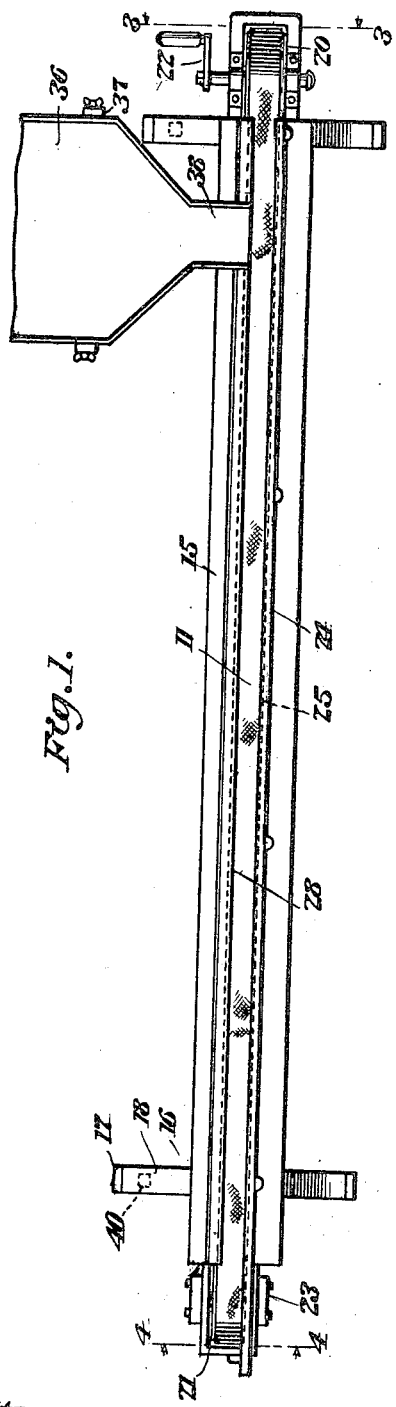
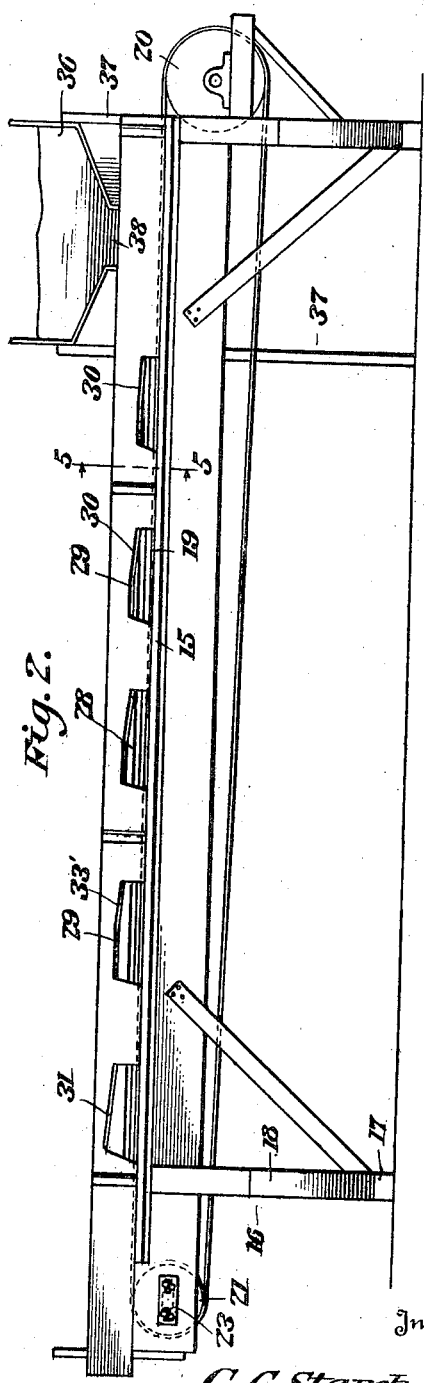
Witnesses
Inventor
G. C. Starcher
By Victor J. Evans
Attorney

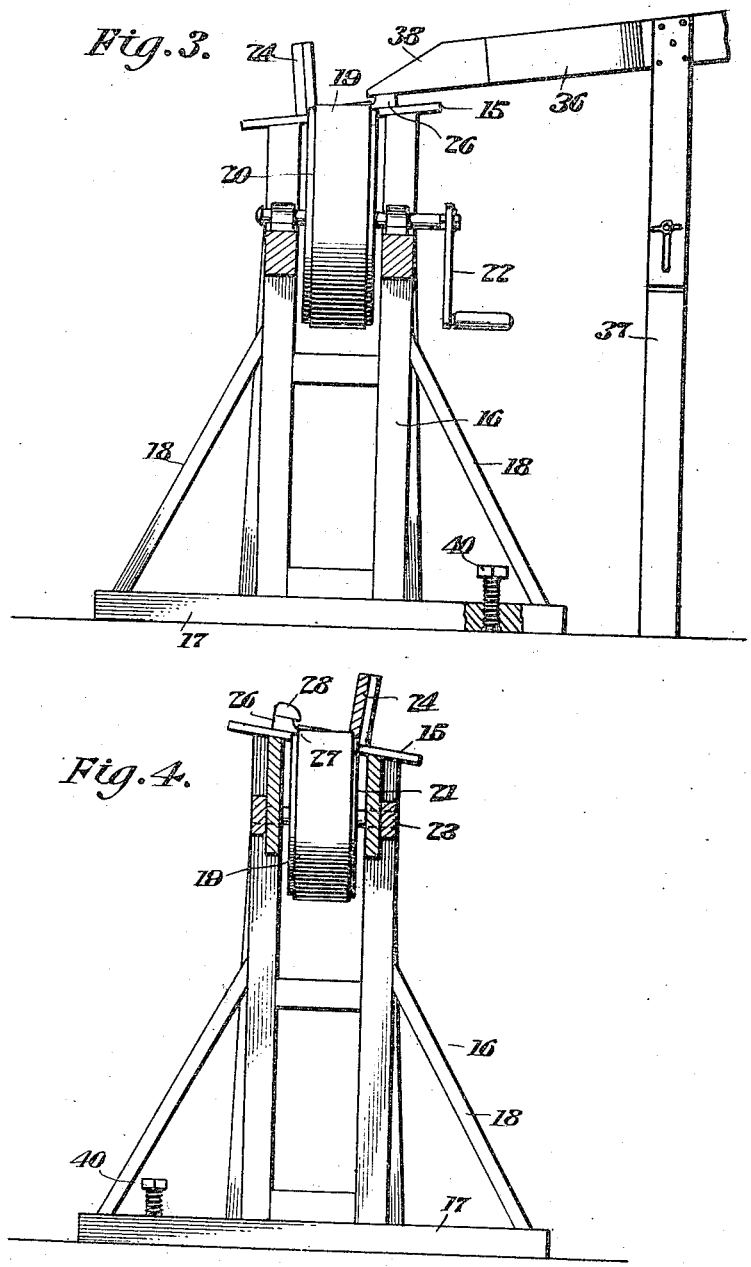

G. C. STARCHER.
FRUIT SIZING MACHINE.
APPLICATION FILED JAN. 2, 1917.

1,258,958.

Patented Mar. 12, 1918.
3 SHEETS—SHEET 3.

Inventor
G. C. Starcher

Witnesses

By Victor J. Evans
Attorney

UNITED STATES PATENT OFFICE.

GEORGE COLUMBUS STARCHER, OF AUBURN, ALABAMA.

FRUIT-SIZING MACHINE.

1,258,958.

Specification of Letters Patent.　Patented Mar. 12, 1918.

Application filed January 2, 1917.　Serial No. 140,203.

*To all whom it may concern:*

Be it known that I, GEORGE C. STARCHER, a citizen of the United States, residing at Auburn, in the county of Lee and State of Alabama, have invented new and useful Improvements in Fruit-Sizing Machines, of which the following is a specification.

This invention relates to fruit sizing machines which are used for grading fruits, such as apples, oranges, peaches and the like, according to size.

The invention has for its object to produce a machine of simple and improved construction, whereby fruit of any kind may be graded according to size, irrespective of whether the fruit is of even, regular shape, such as oranges, or whether the fruit be of rough, uneven and irregular shape, such as is frequently the case, for instance, in certain kinds of apples, such as the York Imperial.

A further object of the invention is to produce a simple and effective machine whereby irregularly shaped fruit will be graded according to its longest transverse diameter.

A further object of the invention is to simplify and improve the construction and arrangement of the grading machine and parts thereof.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a grading machine constructed in accordance with the invention.

Fig. 2 is a side elevation of the same.

Fig. 3 is a sectional view taken on the line 3—3 in Fig. 1.

Fig. 4 is a transverse sectional view taken on the line 4—4 in Fig. 1.

Corresponding parts in the several figures are denoted by like characters of reference.

Figure 5:
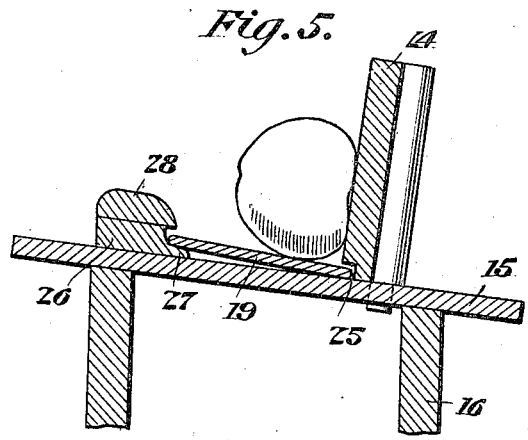
Fig. 5 is a sectional detail view, enlarged, taken on the line 5—5 in Fig. 2.

The bed or table 15 is supported in an inclined or tilted position on the framework 16, which latter includes the transversely disposed sills 17 and inclined braces 18. An endless belt 19 is guided over band wheels or pulleys 20, 21 which are supported, respectively, at the receiving and at the discharge end of the table, the top lead of said belt passing above and the bottom lead below the table. The belt may be driven by power applied to the band wheel 20 by means of an ordinary crank 22 or in any other convenient manner. The bearings 23 supporting the band wheel 21 may be longitudinally adjustable in order that the belt may be properly tensioned.

Mounted at the low side of the tilted or inclined bed or table 15 is the sizing board 24 which extends practically the entire length of the bed, said board being made in one or more pieces or sections, as may be desired, and said board being mounted or secured in position in any convenient manner, preferably in such a way as to enable it to be readily detached so that a different one may be substituted when the machine is to be used for sizing fruits of a different kind. The sizing board is preferably positioned substantially at right angles to the tilted or inclined bed or table, and said sizing board is provided at its lower inner corner with a longitudinal groove 25 to receive the low edge of the endless belt 19 which will thus be guided. Upon the table 15, near the high side of the latter, is secured a longitudinal cleat 26 having a tongue 27 that extends beneath the high edge of the belt, raising the latter slightly above the bed or table, thereby relieving the greater portion of the top lead of the belt of frictional contact with the surface of the table, and enabling the said top lead of the belt to yield slightly in a downward direction producing a cushioning or resilient effect. The cleat 26 has a cap 28 that projects slightly over the belt 19, which latter will thus be positively guided and will be prevented from jumping upwardly intermediately the pulleys 20, 21 over which it is guided; the cap 28 also forms a guard that will prevent any possibility of the fruit carried by the belt from jumping the belt clear of the machine owing to roughness or unsteadiness of motion or any other cause.

Figure 6:
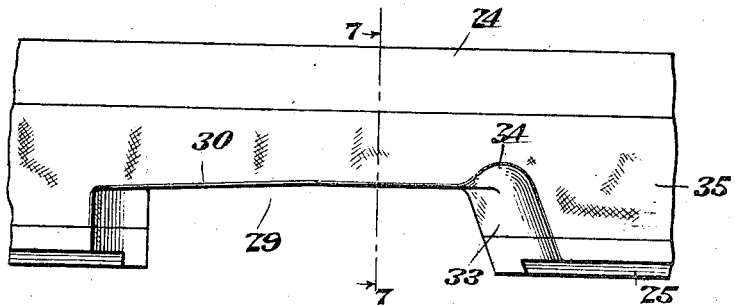
Fig. 6 is a view in side elevation of a portion of the sizing board, showing the inner face thereof.
Figure 7:
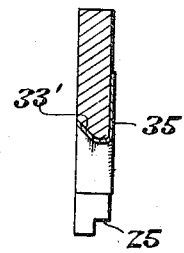
Fig. 7 is a sectional detail view taken on the line 7—7 in Fig. 6.
Figure 8:
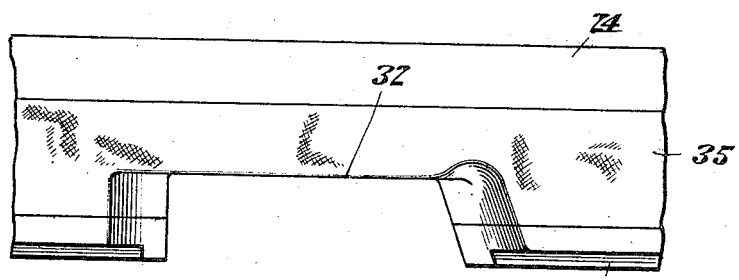
Fig. 8 is a side elevation of a portion of the sizing board showing a slightly modified construction.

The sizing board is provided at intervals with sizing slots 29, there being any desired number of such slots, according to the dimensions of the machine. The slots 29 vary in size, the smallest being near the feed end of the machine from which the slots are progressively larger toward the discharge end. The sizing slots may be of substantially the same length, but the width thereof progressively increases in any desired ratio. It is preferred that a portion of the top wall of each slot be made to slope downwardly in the direction of the feed end of the machine, as indicated at 30 in Figs. 2 and 6, although the entire top wall may be made sloping, as indicated at 31 in Fig. 2, or the entire top wall may be made parallel to the bed, as shown at 32 in Fig. 8, each slot being so formed and proportioned that fruit of a predetermined transverse diameter may escape therethrough. The top wall of each slot is also preferably sloped or inclined in an upward and outward direction, as clearly indicated in Fig. 7 at 33', in order to facilitate the escape of fruits through the slots and to reduce the liability of any fruit being stuck in a slot. The end walls of each slot are made to diverge inwardly, that is to say, in the direction of the endless belt or carrier 19. Adjacent to the end wall 33 near the discharge end of the table there is formed an upwardly extending recess or cavity 34, and said end wall and cavity as well as a portion of the top wall of the slot is preferably covered with padding 35 of felt or other material to positively prevent bruising of fruit.

Arranged adjacent to the side of the bed or table at the receiving end thereof is a feed chute 36 which is preferably supported by an extension leg 37, and which has a throat 38 from which the fruits or objects that are to be graded will be delivered onto the belt or carrier 19. I consider it important that the throat of the feed chute be supported at a slight elevation above the high side of the belt or carrier, and said throat has, therefore, been shown as being supported on a portion of the cleat 26 from which the cap 28 has been removed. Obviously, by leaving the cap intact the drop may be increased, while by reducing the height of the cleat 26 the drop may be diminished.

I have found that by dropping the fruit that is to be graded on the high side of the conveyer belt from a slight elevation the fruit acquires a tumbling movement which is due partly to the drop it receives and partly to the resilient action of the belt, said tumbling movement resulting in placing the base of the fruit very quickly in engagement with the sizing board whereas if the fruit is placed gently on the conveyer belt or slid on to the conveyer belt without a drop, a much longer period is required before the fruit acquires the proper position with respect to the sizing board. It is obvious however, that the drop must not be sufficient to cause the fruit to be bruised or injured.

The cross pieces or sills 17 which support the frame structure 16 have been shown as being provided at one end with adjusting screws 40, whereby the entire structure may be tilted, when desired, thereby varying the tilt or inclination of the bed or table 15. When the machine is thus tilted the extension leg 37 may be lengthened or shortened, as occasion may require.

In the operation of this machine the belt or carrier 19 may be driven by power derived from any convenient source; it may be driven manually through the medium of a crank 22 by the operator who is stationed adjacent to the receiving end of the machine, beside the feed chute 36, and who, while turning the crank with one hand, may use his other hand for the purpose of guiding and sorting the fruit passing over the chute, removing the defective specimens. A fruit, such as an apple, dropping onto the belt at the high side of the latter will quickly gravitate in the direction of the feed board, and if such fruit has a flat side, such as the stem end of an apple, such flat side will quickly engage the sizing board, as seen in Fig. 5, and, by contact or engagement with said board, will receive a rotary motion opposite to that of the belt or conveyer. I have found by careful experimentation that the throat of the chute should be spaced at least twelve or fourteen inches from the first sizing slot in order that the rotary motion of the fruit may be in progress by the time said slot is reached. When the fruit reaches the slot, the slope or incline of the end wall near the receiving end of the machine will tend to guide the fruit outward through the slot, and if the transverse diameter of the fruit is less than the height of the slot, the fruit will obviously escape therethrough, the escape being facilitated by the upward and outward inclination of the top wall of the slot. If, on the other hand, the fruit is too large to escape through the first slot, it will be guided by the slope of the end wall 33 in an inward direction and onto the belt or conveyer, the padded end wall 33 and cavity 34 serving to prevent possibility of the fruit being bruised or of its becoming stuck in the slot. In a similar manner fruits of a slightly larger size will escape through the next sizing slot, and so on, until fruits too large to pass through any of the slots will be discharged over the tail end of the machine. The fruits discharged through the different sizing slots and over the tail end of the machine may be received in suitable receptacles, it being customary to provide a conveyer adjacent to each sizing slot, whereby the fruits may be carried safely to a place of deposit, but such instrumentalities are common in fruit sizing machines and have not been herein illustrated.

The treatment of fruits of various kinds and shapes may involve the necessity of tilting the bed or table of a machine to a greater or less extent, and such tilting may be resorted to practically without limitation. Sizing boards having different sized slots may also be used, and the precise shape or configuration of the slots may be varied providing that the general characteristics herein described are retained.

Having thus described the invention, what is claimed as new, is:—

1. In a fruit sizing machine, a laterally tilted bed and a conveyer belt having its top lead guided over said bed and contacting therewith at one edge only.

2. In a fruit sizing machine, a laterally tilted bed, a conveyer belt having its top lead guided over said bed, and means for tilting the top lead of the conveyer belt with respect to the bed to space the conveyer belt, except one edge portion thereof, from the bed.

3. In a fruit sizing machine, a laterally tilted bed, a conveyer belt having its top lead guided over the bed, and a sizing board supported adjacent to the low side of the bed, substantially at right angles thereto and having graded openings for the passage of fruit.

4. In a fruit sizing machine, a laterally tilted bed, a conveyer belt having its top lead guided over the bed, and a sizing board supported adjacent to the low side of the bed, substantially at right angles thereto, said sizing board having a guide groove for one edge of the conveyer belt.

5. In a fruit sizing machine, a laterally tilted bed, a conveyer belt having its top lead guided over the bed, and a sizing board supported adjacent to the low side of the bed, substantially at right angles thereto, said sizing board having a guide groove for one edge of the conveyer belt, and means whereby the other side of the top lead of the conveyer is tilted upwardly with respect to the bed.

6. In a fruit sizing machine, a laterally tilted bed, a sizing board supported substantially at right angles adjacent to the low side thereof, said board having a guide groove, a conveyer belt having its top lead guided over the table with one side edge in engagement with said groove, and a cleat mounted adjacent to the high side of the table and having a tongue extending beneath the other side of the belt to lift the latter from the table.

7. In a fruit sizing machine, a laterally tilted bed, a sizing board supported substantially at right angles adjacent to the low side thereof, said board having a guide groove, a conveyer belt having its top lead guided over the table with one side edge in engagement with said groove, and a cleat mounted adjacent to the high side of the table and having a tongue extending beneath the other side of the belt to lift the latter from the table, said cleat having a cap that projects over the belt in the direction of the low side thereof.

8. In a fruit sizing machine, a laterally tilted bed, a conveyer belt having its top lead guided over said bed, means whereby said top lead is tilted upward with respect to the high side of the table, and a sizing board supported adjacent to the low side of the belt substantially at right angles to the bed, said board having sizing slots of progressively increasing size from the receiving to the discharge end of the machine.

9. In a fruit sizing machine, a laterally tilted table, a conveyer belt guided over the same, a sizing board adjacent to the low side of the table, said board having sizing slots of progressively increasing dimensions, and a feed chute having a discharge throat supported above the belt to provide a slight drop for fruits passing from the chute to the belt.

10. In a sizing machine, the combination with a conveyer belt, of a sizing element supported adjacent thereto, said sizing element having slots and solid portions, the latter portions coöperating with the belt to impart a rotary motion to objects carried by the belt in a reverse direction to the movement of the belt.

11. In a sizing machine, the combination with a conveyer belt, of a sizing element supported adjacent thereto and coöperating therewith to impart a rotary motion to objects carried by the belt in a reverse direction to the movement of the belt, said sizing element having graduated slots for the escape of the objects carried by the belt.

12. In a sizing machine, a conveyer belt, supporting means therefor, means for distorting the top lead of the belt to a laterally inclined position with respect to the bed, and a sizing board supported adjacent to the low side of the belt, said board having discharge slots of progressively increasing dimensions.

13. In a machine of the class described, the combination with a conveyer belt, of a sizing board supported adjacent thereto, said board having slots with end walls diverging in the direction of the belt, and an upwardly and outwardly inclined top wall.

14. In a machine of the class described, the combination with a conveyer belt, of a sizing board supported adjacent thereto, said board having slots with end walls diverging in the direction of the belt, and an upwardly and outwardly inclined top wall, the board being formed with an upwardly extending cavity adjacent to the end wall at the discharge end of the slot.

15. In a machine of the class described, the combination with a conveyer belt, of a sizing board supported adjacent thereto, said board having slots with end walls diverging in the direction of the belt, and an upwardly and outwardly inclined top wall, the board being formed with an upwardly extending cavity adjacent to the end wall at the discharge end of the slot, and padding applied to the last mentioned end wall, the cavity and the top wall.

In testimony whereof I affix my signature.

GEORGE COLUMBUS STARCHER.

Copies of this patent may be obtained for five cents each, by addressing the "Commissioner of Patents, Washington, D. C."